(12) United States Patent
Tanigawa et al.

(10) Patent No.: US 9,522,505 B2
(45) Date of Patent: Dec. 20, 2016

(54) FIBER BUNDLE PROCESSING DEVICE

(71) Applicants: Murata Machinery, Ltd., Kyoto-shi, Kyoto (JP); Toyota Jidosha Kabushiki Kaisha, Toyota-shi, Aichi (JP)

(72) Inventors: Motohiro Tanigawa, Kyoto (JP); Daigoro Nakamura, Kyoto (JP); Tadashi Uozumi, Kyoto (JP); Ken Hatta, Toyota (JP)

(73) Assignees: MURATA MACHINERY, LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 152 days.

(21) Appl. No.: 14/387,071

(22) PCT Filed: Mar. 8, 2013

(86) PCT No.: PCT/JP2013/056469
§ 371 (c)(1),
(2) Date: Sep. 22, 2014

(87) PCT Pub. No.: WO2013/141045
PCT Pub. Date: Sep. 26, 2013

(65) Prior Publication Data
US 2015/0083338 A1 Mar. 26, 2015

(30) Foreign Application Priority Data
Mar. 23, 2012 (JP) .................. 2012-067691

(51) Int. Cl.
*B29C 70/54* (2006.01)
*B29C 70/38* (2006.01)
(Continued)

(52) U.S. Cl.
CPC ............. *B29C 70/384* (2013.01); *B29B 15/08* (2013.01); *B29C 35/0266* (2013.01);
(Continued)

(58) Field of Classification Search
CPC ...................................... B29C 70/54
(Continued)

(56) References Cited

U.S. PATENT DOCUMENTS 4,347,287 A * 8/1982 Lewis .................. B29C 70/525
264/136
5,047,281 A * 9/1991 Betz ........................ B29B 15/08
428/198

(Continued)

FOREIGN PATENT DOCUMENTS

DE 3446406 A1 4/1986
DE 4011293 A1 10/1990
(Continued)

OTHER PUBLICATIONS

International preliminary report on patentability dated Sep. 23, 2014 issued in corresponding PCT application PCT/JP2013/056469.
(Continued)

*Primary Examiner* — Jeff Aftergut
(74) *Attorney, Agent, or Firm* — DLA Piper LLP (US)

(57) ABSTRACT

A fiber bundle processing device (filament winding device (100)) that processes a fiber bundle (Fb) having a heat-curable resin impregnated therein, characterized by: comprising a curing device (45A) capable of applying heat to the fiber bundle (Fb); and the curing device (45A) curing or semi-curing some of the resin impregnated into the fiber bundle (Fb), when the fiber bundle (Fb) is partway through being guided into the fiber bundle processing device (filament winding device (100)).

6 Claims, 7 Drawing Sheets

(51) Int. Cl.
  *B29B 15/08* (2006.01)
  *B29C 35/02* (2006.01)
  *C08J 5/24* (2006.01)
  *B29C 70/16* (2006.01)
  *B29C 53/58* (2006.01)
  *B29K 105/24* (2006.01)
  *B29K 101/10* (2006.01)

(52) U.S. Cl.
  CPC .............. *B29C 70/16* (2013.01); *B29C 70/54* (2013.01); *C08J 5/24* (2013.01); *B29C 53/582* (2013.01); *B29C 2035/0211* (2013.01); *B29K 2101/10* (2013.01); *B29K 2105/243* (2013.01)

(58) Field of Classification Search
  USPC ........................... 156/166, 290, 307.7, 307.1
  See application file for complete search history.

(56) References Cited

U.S. PATENT DOCUMENTS

| | | | |
|---|---|---|---|
| 5,101,094 A | 3/1992 | Keller et al. | |
| 5,478,599 A | 12/1995 | Iyer et al. | |
| 2002/0168504 A1 | 11/2002 | Yamaji et al. | |
| 2009/0314872 A1 | 12/2009 | Uozumi et al. | 242/410 |
| 2012/0015135 A1 | 1/2012 | Beraud et al. | |

FOREIGN PATENT DOCUMENTS

| | | |
|---|---|---|
| DE | 69432357 T2 | 11/2003 |
| DE | 60110543 T2 | 1/2006 |
| DE | 102010008633 A1 | 8/2011 |
| DE | 102012101295 A1 | 8/2013 |
| JP | 4-244834 A * | 9/1992 |
| JP | 08100349 A | 4/1996 |
| JP | 2000-191807 | 7/2000 |
| JP | 2002285460 A | 10/2002 |
| JP | 2005-335296 | 12/2005 |
| JP | 2007-260976 | 10/2007 |
| JP | 2010-005831 | 1/2010 |
| JP | 2010005965 A | 1/2010 |
| JP | 2010-023481 | 2/2010 |
| JP | 2010-234658 | 10/2010 |
| JP | 2010-264680 | 11/2010 |

OTHER PUBLICATIONS

Japanese language international search report dated Jun. 3, 2013 and its English language translation issued in corresponding PCT application PCT/JP2013/056469 foreign patent documents, dated 2013.

* cited by examiner

FIBER BUNDLE PROCESSING DEVICE

CROSS REFERENCE TO RELATED APPLICATIONS

This application is a national stage of international application PCT/JP2013/056469, filed on Mar. 8, 2013, and claims the benefit of priority under 35 USC 119 of Japanese application 2012-067691, filed on Mar. 23, 2012, which are incorporated herein by reference.

TECHNICAL FIELD

The present invention relates to a technique of a fiber bundle processing device.

BACKGROUND ART

For example, a filament winding device which winds a fiber bundle impregnated with heat-curable resin on to the outer peripheral surface of a liner has been known (for example, see Patent Literature 1). Such filament winding device is provided with a helical winding device and a hoop winding device. With respect to the helical winding device, the fiber bundle is unwound from each bobbin accommodated in a creel stand, and thereby the fiber bundle is wound on to the outer peripheral surface of the liner. With respect to the hoop winding device, the fiber bundle is unwound from each bobbin arranged on the hoop winding device, and thereby the fiber bundle is wound on to the outer peripheral surface of the liner.

Meanwhile, the fiber bundle is composed of a plurality of fibers arranged substantially in parallel with each other, having heat-curable resin impregnated therein. Therefore, when heat is applied, such fiber bundle is cured or semi-cured, and thereby the fibers composing the fiber bundle would not be separated from each other.

However, when the fiber bundle is partway through being guided into the liner, the resin of the fiber bundle has not been cured or semi-cured yet, and therefore each fiber composing the fiber bundle can be separated from each other. Therefore, according to the conventional filament winding device, when some of the fibers comprising the fiber bundle are cut when the fiber bundle is partway through being guided into the liner, the cut fibers would be separated with each other and be tangled in a guide or the like.

PRIOR ART DOCUMENTS

Patent Literature

Patent Literature 1: the Japanese Patent Laid Open Gazette 2010-23481

SUMMARY OF THE INVENTION

Problems to be Solved by the Invention

The object of the invention is to provide a fiber bundle processing device in which cut fibers would not be tangled in a guide or the like even if some of the fibers comprising a fiber bundle are cut when the fiber bundle is partway through being guided into the liner.

Means for Solving the Problems

A first aspect of the present invention is a fiber bundle processing device that processes a fiber bundle having a heat-curable resin impregnated therein. The fiber bundle processing device is characterized by including a curing device capable of applying heat to the fiber bundle. The curing device cures or semi-cures some of the resin impregnated into the fiber bundle, when the fiber bundle is partway through being guided into the fiber bundle processing device.

In a second aspect of the present invention, with respect to the fiber bundle processing device according to the first aspect, the curing device cures or semi-cures the resin impregnated into the fiber bundle at regular intervals along a feeding direction of the fiber bundle.

In a third aspect of the present invention, with respect to the fiber bundle processing device according to the second aspect, the curing device cures or semi-cures the resin impregnated into the fiber bundle perpendicularly relative to the feeding direction of the fiber bundle.

In a fourth aspect of the present invention, with respect to the fiber bundle processing device according to the first to the third aspect, the curing device includes: a roller that rotates in a state in contact with the fiber bundle; and an iron part that comes into contact with the fiber bundle to apply heat. For the curing device, the iron part integrally rotates with the roller in a state where the iron part is attached to the roller.

In a fifth aspect of the present invention, with respect to the fiber bundle processing device according to the first to the third aspect, the curing device includes: an arm that oscillates along an approaching/separating direction to/from the fiber bundle; and an iron part that comes into contact with the fiber bundle to apply heat. For the curing device, the iron part integrally oscillates with the arm in a state where the iron part is attached to the arm.

Effects of the Invention

The present invention exerts effects described below.

According to the first aspect, some of the resin impregnated in the fiber bundle is cured or semi-cured by the curing device when the fiber bundle is partway through being guided into the fiber bundle processing device. Accordingly, even if some of the fibers comprising the fiber bundle are cut, the cut fibers can be held by the cured or semi-cured part of the resin. Therefore, with regard to the fiber bundle processing device according to the present embodiment, even if some of the fibers comprising the fiber bundle are cut, the cut fibers would not be tangled in a guide or the like.

According to the second aspect, the resin impregnated into the fiber bundle is cured or semi-cured at regular intervals along the feeding direction of the fiber bundle by the curing device. Accordingly, the cut fibers can be held by the cured or semi-cured part of the resin while maintaining flexibility of the fiber bundle.

According to the third aspect, the resin impregnated into the fiber bundle is cured or semi-cured by the curing device perpendicularly relative to the feeding direction of the fiber bundle. Accordingly, the cut fibers can be held by the cured or semi-cured part of the resin while maintaining sufficient flexibility of the fiber bundle. Also, since a rigidity of the fiber bundle against a twisting direction becomes high, twist of the fiber bundle is suppressed. Furthermore, since a rigidity of the fiber bundle against a width direction becomes high, the fiber bundle can be transferred in a condition such that the width dimension of the fiber bundle is held.

According to the fourth aspect, the iron part integrally rotates with the roller in a state where the iron part is attached to the roller. Accordingly, in spite of simple structure, some of the resin impregnated in the fiber bundle can be cured or semi-cured continuously.

According to the fifth aspect, the iron part integrally oscillates with the arm in a state where the iron part is attached to the arm. Accordingly, in spite of simple structure, some of the resin impregnated in the fiber bundle can be cured or semi-cured continuously.

DESCRIPTION OF EMBODIMENTS

Next, an explanation will be given of embodiments of the present invention.

First of all, a brief explanation will be given of an overall configuration of a fiber bundle processing device according to the present embodiment. Here, the fiber bundle processing device of the present embodiment is a filament winding device 100 (hereinafter, "FW device 100").

Figure 1:
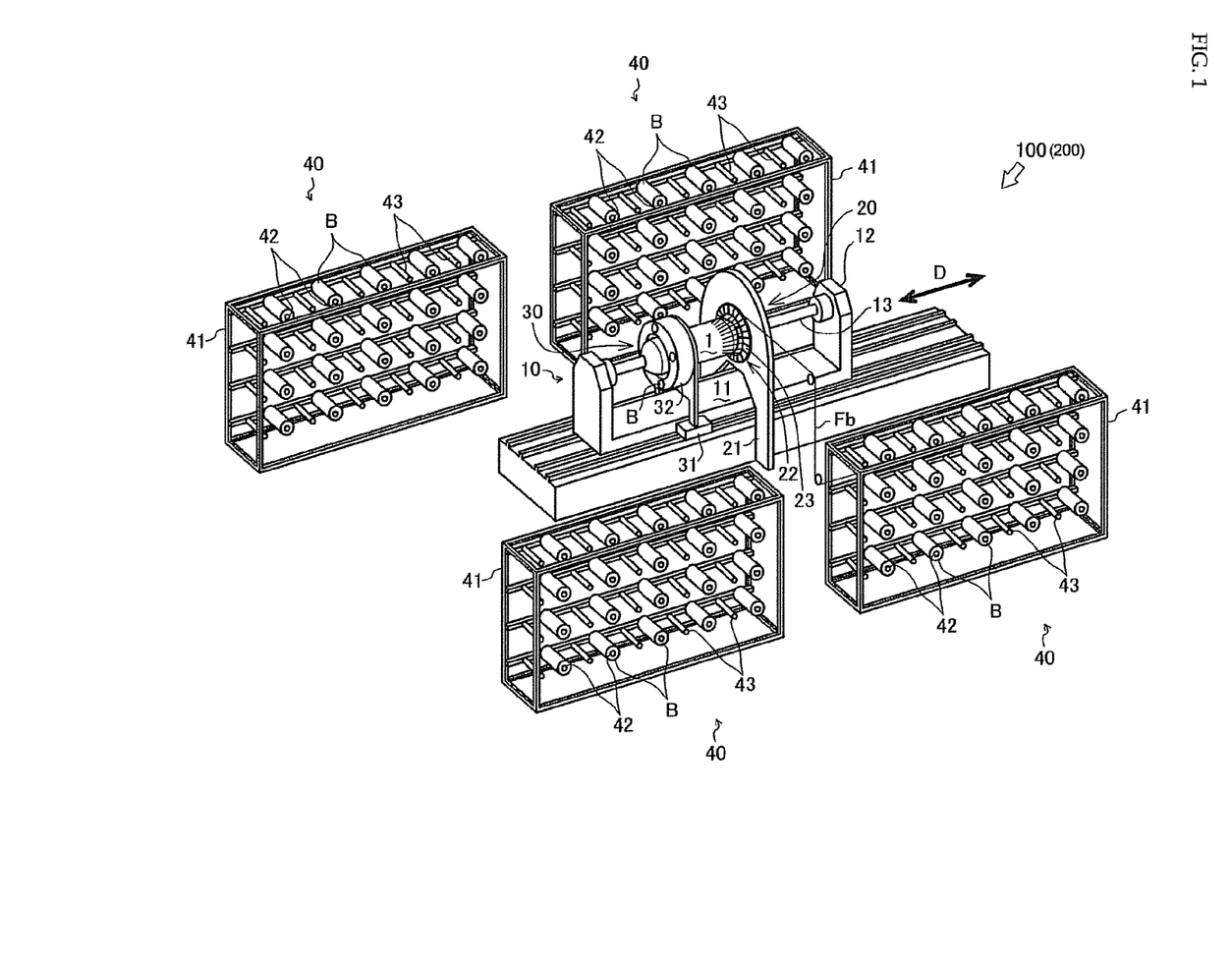
FIG. 1 is a figure illustrating an overall configuration of a filament winding device 100.

FIG. 1 illustrates an overall configuration of the FW device 100. An arrow D in the drawing indicates a transfer direction of a liner 1. The direction in parallel to the transfer direction of the liner 1 is regarded as the longitudinal direction of the FW device 100, and one direction of transferring the liner 1 is defined as the front side, and the other direction opposite thereto is defined as the rear side. The FW device 100 reciprocates the liner 1 in the longitudinal direction, whereby the front side and the rear side is defined depending on the transfer direction of the liner 1.

Figure 2:
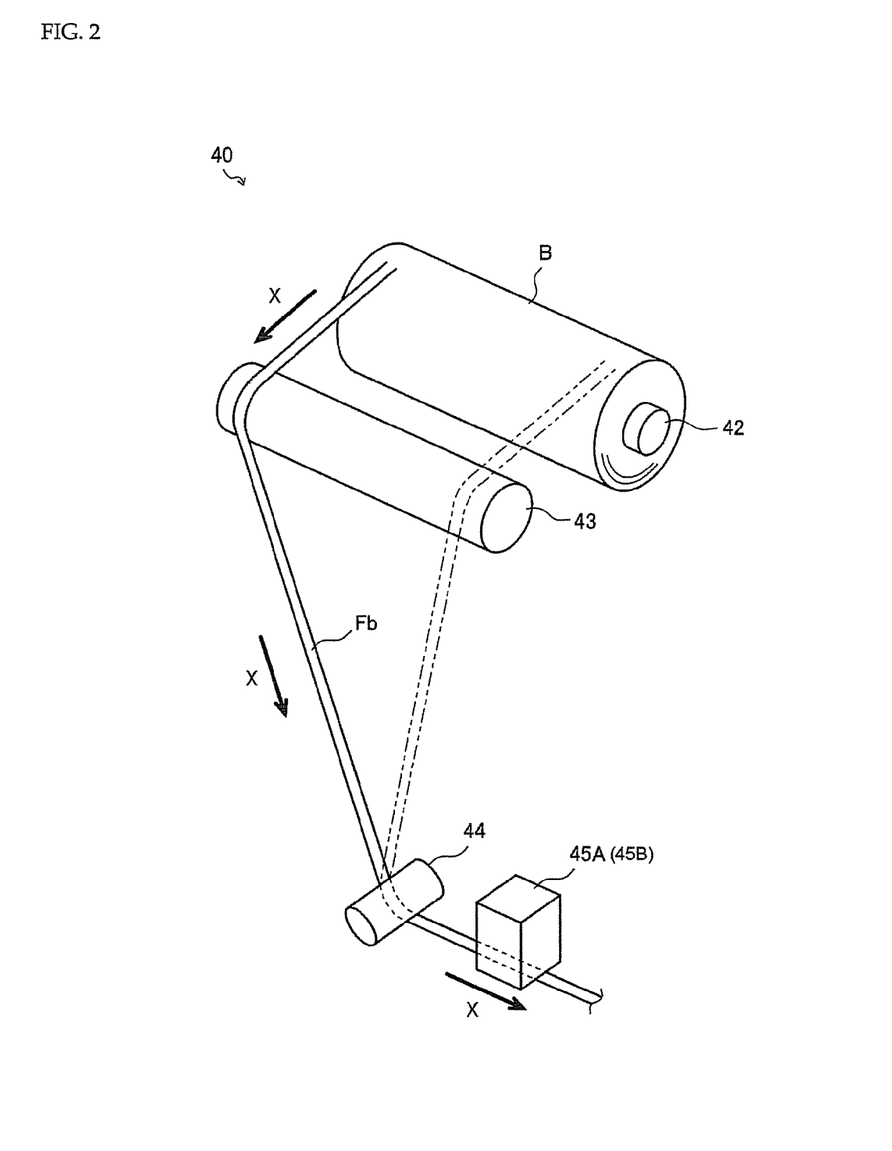
FIG. 2 is a figure illustrating a part of configuration of a creel stand 40.

FIG. 2 illustrates a part of configuration of a creel stand 40. Arrows X in the drawing indicate feeding directions of a fiber bundle Fb.

The FW device 100 winds the fiber bundle Fb on to the outer peripheral surface of the liner 1. The FW device 100 mainly includes a liner transfer device 10, a helical winding device 20, a hoop winding device 30, and the creel stands 40.

The liner 1 is for example a substantially cylindrical hollow container formed by a high strength aluminum, polyamide resin or the like. The pressure resistance of the liner 1 is improved by winding the fiber bundle Fb on to the outer peripheral surface of the liner 1. That is to say, the liner 1 is a base member constituting a pressure resistant hollow container.

The liner transfer device 10 transfers the liner 1 rotationally or irrotationally. In particular, the liner transfer device 10 rotates the liner 1 about the longitudinal direction of the FW device 100 as a center axis, and also the liner transfer device 10 transfers the liner 1 in the longitudinal direction. The liner transfer device 10 mainly includes a pedestal 11, liner support frames 12, and a rotation shaft 13.

The pedestal 11 is placed on rails that are extending in the longitudinal direction of the FW device 100. The pedestal 11 is provided with a pair of liner support frames 12 and the rotation shaft 13. The liner 1 attached to the rotation shaft 13 is rotated in one direction via a power mechanism (not shown).

Because of this configuration, it is possible that the liner 1 is rotated about the longitudinal direction of the FW device 100 as a center axis and is transferred in the longitudinal direction of the FW device 100 by the liner transfer device 10.

The helical winding device 20 winds the fiber bundle Fb on to the outer peripheral surface of the liner 1. In particular, the helical winding device 20 performs so-called helical winding in which the winding angle of the fiber bundle Fb is set to be a prescribed value relative to the longitudinal direction of the FW device 100. The helical winding device 20 mainly includes a pedestal 21 and a helical wrapping device 22.

The pedestal 21 is provided with the helical wrapping device 22. The helical wrapping device 22 is provided with a plurality of fiber bundle guides 23 that guide the fiber bundles Fb. The fiber bundle Fb guided by each fiber bundle guide 23 is wrapped around the outer peripheral surface of the liner 1 passing through while rotating.

Because of this configuration, it is possible that the helical winding device 20 performs helical winding, where the winding angle of the fiber bundle Fb is set to be the prescribed value relative to the longitudinal direction of the FW device 100.

The hoop winding device 30 winds the fiber bundle Fb on to the outer peripheral surface of the liner 1. In particular, the hoop winding device 30 performs so-called hoop winding in which the winding angle of the fiber bundle Fb is set to be substantially perpendicular to the longitudinal direction of the FW device 100. The hoop winding device 30 mainly includes a pedestal 31 and a hoop wrapping device 32.

The pedestal 31 is provided with the hoop wrapping device 32. The hoop wrapping device 32 includes a plurality of bobbins B in which the fiber bundles F are wound, and by self-rotation of the hoop wrapping device 32, the fiber bundle Pb unwound from each bobbin B is wrapped around the outer peripheral surface of the liner 1 which is in a irrotational state.

Because of this configuration, it is possible that the hoop winding device 30 performs hoop winding, where the winding angle of the fiber bundle Fb is set to be substantially perpendicular to the longitudinal direction of the FW device 100.

The creel stands 40 supply fiber bundles Fb to the helical winding device 20. In particular, the creel stand 40 supplies the fiber bundle Fb to each fiber bundle guide 23 of the helical wrapping device 22 constituting the helical winding device 20. The creel stand 40 mainly includes a rack 41, bobbin support shafts 42, rollers 43, guides 44, and curing devices 45A.

A plurality of bobbin support shafts 42 and rollers 43 are attached to the rack 41 in parallel with each other. The guides 44 are attached to the rack 41 in a state where the guides 44 are perpendicular to the axial directions of the bobbin support shafts 42. In a state that the fiber bundle Fb is pulled, the bobbin B supported by the bobbin support shaft 42 rotates, whereby the fiber bundle Fb is unwound (rollingly reeling-off type). The fiber bundle Fb unwound from the bobbin B is led to the guide 44 through the roller 43, and then fed to the fiber bundle guide 23 through the curing device 45A.

Because of this configuration, the creel stand 40 is capable of feeding the fiber bundle Fb to each fiber bundle guide 23 of the helical wrapping device 22 constituting the helical winding device 20.

Figure 3:
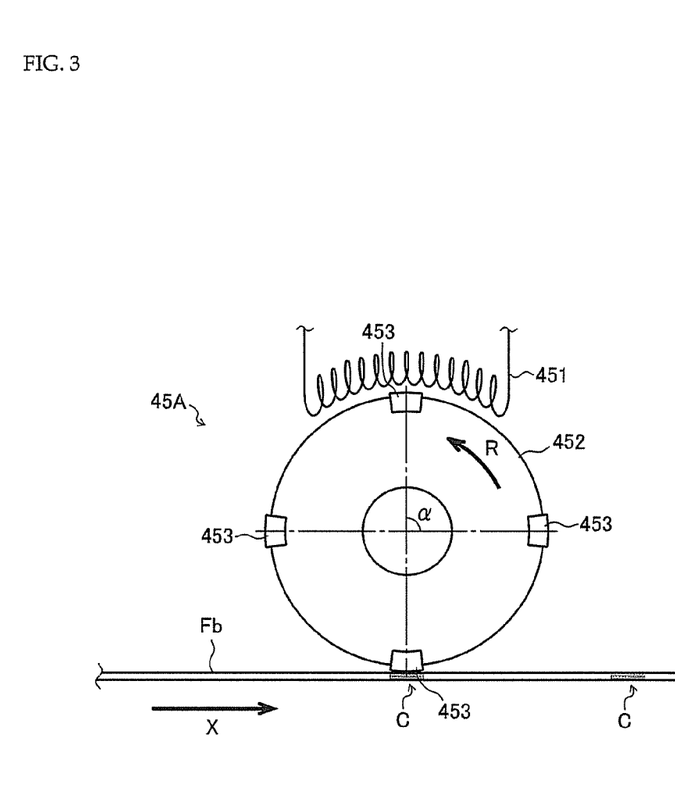
FIG. 3 is a figure illustrating a configuration of a curing device 45A included in the filament winding device 100 according to a first embodiment.

Next, a detailed explanation will be given of a configuration of the curing device 45A.

FIG. 3 illustrates the configuration of the curing device 45A included in the FW device 100 which is a first embodiment. An arrow X in the drawing indicates the feeding direction of the fiber bundle Fb. An arrow R in the drawing indicates the rotation direction of a roller 452 which constitutes the curing device 45A.

The curing device 45A cures or semi-cures the resin impregnated into the fiber bundle Fb by applying heat to the fiber bundle Fb. The state where heat is sufficiently applied for a long period of time and no more increase of hardness is possible is defined as "cured", whereas the state where additional hardening is possible by applying heat and the hardness is less than the above "cured" state is defined as "semi-cured". The curing device 45A mainly includes a heater 451, the roller 452, and iron parts 453 protruded from the outer peripheral surface of the roller 452.

The heater 451 is a coil made of heating wire (such as a kanthal wire or a Nichrome wire) which is formed into a spiral shape, whereby the heater 451 generates heat when a current flows therein. In the present embodiment, the heater 451 is attached to be opposed to the fiber bundle Fb. The heater 451 is configured such that, upon the fiber bundle Fb is fed to the helical winding device 20, the heater 451 continues heating. Since the heater 451 of the present embodiment applies heat to the fiber bundle Fb through the iron parts 453, sufficiently large calorific value is secured. The calorific value of the heater 451 can be set to a value being capable of curing/semi-curing the fiber bundle Fb.

The roller 452 is a rotation body which is formed into a cylindrical shape, and is driven-rotated by the fiber bundle Fb that is fed while being in contact with roller 452. In the present embodiment, the roller 452 is attached between the fiber bundle Fb and the heater 451. Since the roller 452 rotates while being in contact with the fiber bundle Fb, vibrations of the fiber bundle Fb are suppressed, and thereby the fiber bundle Fb is prevented from approaching the heater 451. Although the roller 452 in the present embodiment is configured to be driven-rotated by the fiber bundle Pb, the roller may be configured to be actively rotated by a driving device, whereby the fiber bundle Fb is fed.

The iron part 453 is a metal plate formed into a substantially rectangular shape, and the iron part 453 stores heat while approaching the heater 451. The iron part 453 applies heat to the fiber bundle Fb by contacting the fiber bundle Fb. In the present embodiment, the iron parts 453 are attached to the surface of the roller 452. Accordingly, the iron parts 453 integrally rotate with the roller 452. In the present embodiment, in total, four iron parts 453 are attached to the surface of the roller 452 at regular rotational phase angles α. That is to say, the iron parts 453 are attached to the surface of the roller 452 with the same rotational phase angle 90°. However, the rotational phase angle α with which the iron parts 453 are attached is not limited to this (the number of iron parts 453 is not limited to this).

Figure 4:
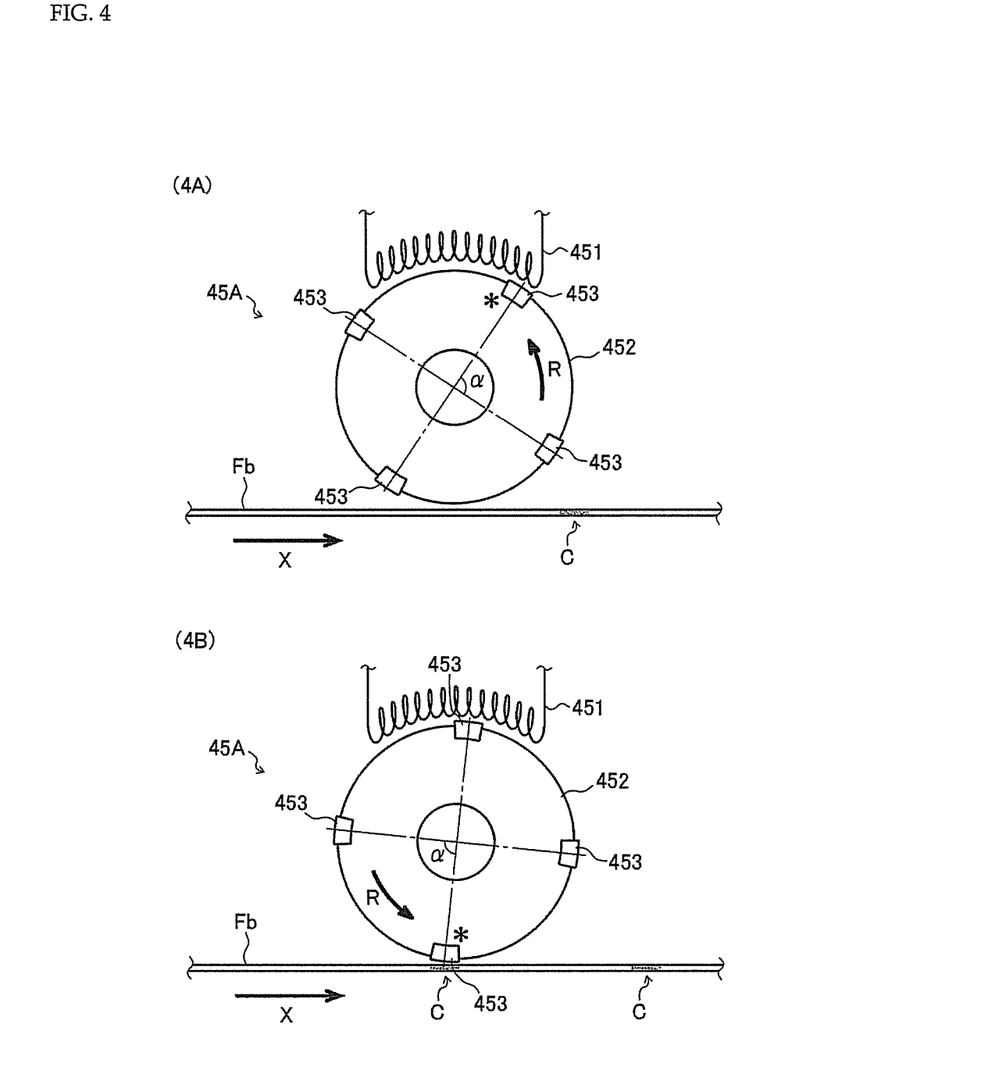
FIG. 4 is a figure illustrating an operation mode of the curing device 45A.

Hereinafter, an explanation will be given of an operation mode of the curing device 45A. Here, an explanation will be given focusing on one iron part 453 that is marked with *.

FIG. 4 illustrates the operation mode of the curing device 45A. An arrow X in the drawing indicates the feeding direction of the fiber bundle Fb. An arrow R in the drawing indicates the rotation direction of the roller 452 constituting the curing device 45A.

First of all, the iron part 453 integrally rotates with the roller 452, and thereby approaches the heater 451 (see FIG. 4A). By approaching the heater 451, the iron part 453 is heated, and the heat applied from the heater 451 is stored.

Next, the iron part 453 integrally rotates with the roller 452, and thereby the iron part 453 comes into contact with the fiber bundle Pb (see FIG. 4B). By coming into contact with the fiber bundle Fb, the iron part 453 releases the stored heat. That is to say, by coming into contact with the fiber bundle Fb, the iron part 453 applies heat to the fiber bundle Fb.

Because of this configuration, the curing device 45A cures or semi-cures some of the resin impregnated into the fiber bundle Pb, when the fiber bundle Fb is partway through being guided into the liner 1.

Figure 7:
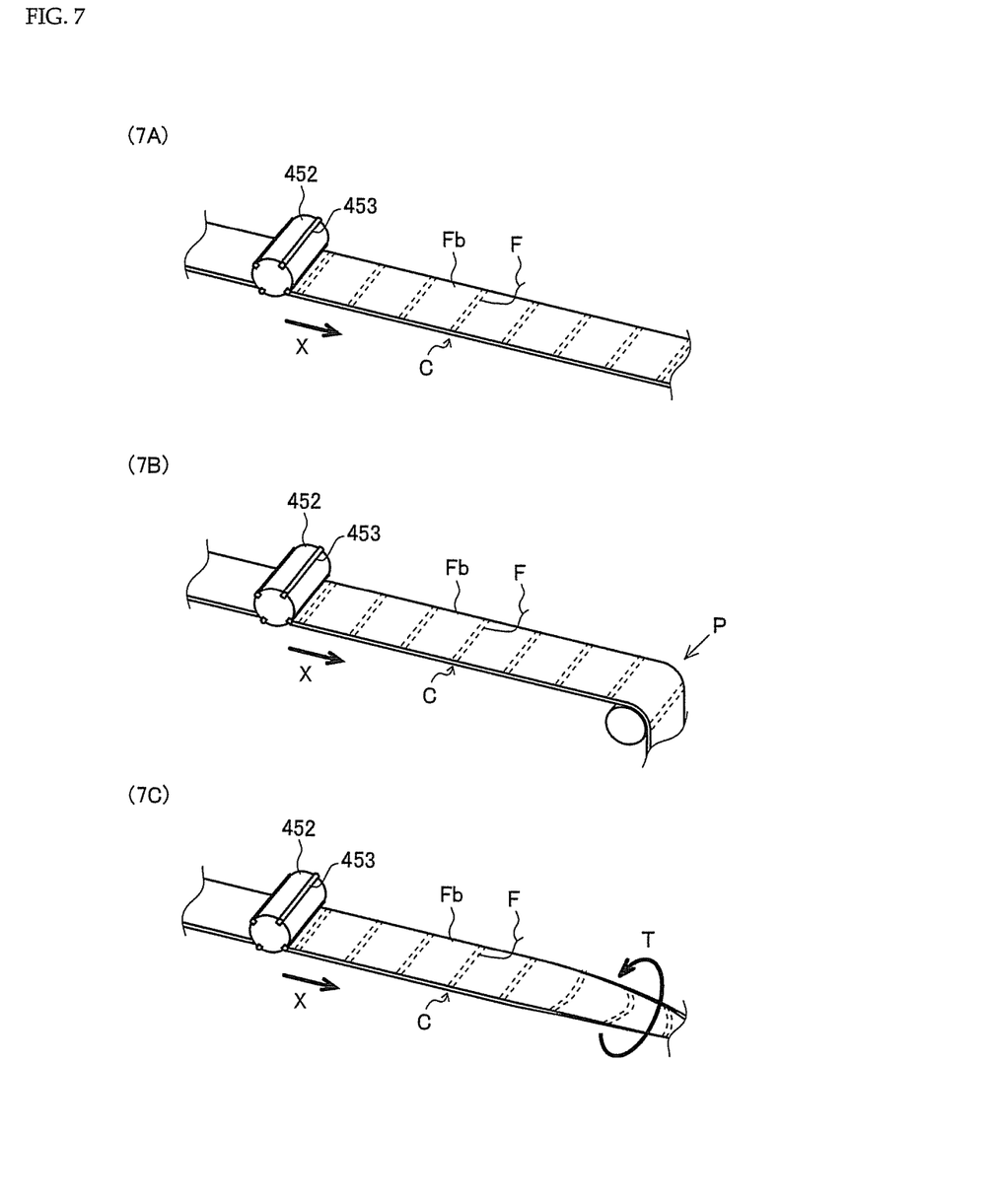
FIG. 7 is a figure illustrating a fiber bundle Fb in which some of the resin has been cured or semi-cured.

As shown in FIG. 7A, this exerts effects such that, even if some of fibers F comprising the fiber bundle Fb are cut, the cut fibers F can be held by cured or semi-cured part C of the resin. That is to say, even if some of the fibers F contained in the fiber bundle F are cut, the cut fibers F are prevented from being separated. Therefore, according to the FW device 100 of the present embodiment, even if some of the fibers F composed of the fiber bundle Fb are cut, the cut fibers F would not be tangled in a guide or the like.

Also, as mentioned above, the iron parts 453 are attached to the surface of the roller 452 with the same rotational phase angle 90°. Accordingly, the curing device 45A cures or semi-cures the resin impregnated into the fiber bundle Fb at regular intervals along the feeding direction of the fiber bundle Fb.

As shown in FIG. 7B, this exerts effects such that, the cut fibers F can be held by cured or semi-cured part C of the resin while maintaining flexibility of the fiber bundle Fb. That is to say, the cut fibers F are prevented from being separated while maintaining the flexibility of the fiber bundle Fb so as to prevent a minimum bending radius of the fiber bundle Fb at a point P in which the feeding direction of the fiber bundle Fb is bent by the guide or the like from getting bigger.

Furthermore, with respect to the curing device 45A, the iron parts 453 are attached to the roller 452 in a state where the iron parts 453 are in parallel to a rotation axis of the roller 452. Accordingly, the resin perpendicularly impregnated into the fiber bundle Fb relative to the feeding direction of the fiber bundle Fb is cured or semi-cured by the curing device 45A.

As shown in FIG. 7B, this exerts effects such that, the cut fibers F can be held by the cured or semi-cured part C of the resin while maintaining sufficient flexibility of the fiber bundle Fb. Also, as shown in FIG. 7C, this configuration exerts effects such that, since the rigidity of the fiber bundle Fb against a twisting direction becomes high, twist of the fiber bundle Fb can be suppressed. That is to say, since the cured or semi-cured part C of the fiber bundle Fb serves as resistance to the twisting force of the fiber bundle Fb, twist of the fiber bundle Fb is suppressed. Furthermore, because of the improved rigidity of the fiber bundle Fb against a width direction, the fiber bundle Fb can be transferred in a condition such that the width dimension of the fiber bundle Fb is maintained.

The present curing device 45A is characterized in that the iron parts 453 are integrally rotated with the roller 452 in a state where the iron parts 453 are attached to the roller 452.

Accordingly, in spite of simple structure, some of the resin impregnated into the fiber bundle Fb can be cured or semi-cured continuously.

With respect to the above-described FW device 100, one curing device 45A is provided for one fiber bundle Fb. However, alternatively, a plurality of curing devices 45A may be provided for one fiber bundle Fb. Also, alternatively, the curing devices 45A may be arranged vertically in a manner clamping the fiber bundle Fb.

Furthermore, with respect to the FW device 100, the curing devices 45A are attached to the creel stand 40. However, the attached positions of the curing devices 45A are not limited to these.

Figure 5:
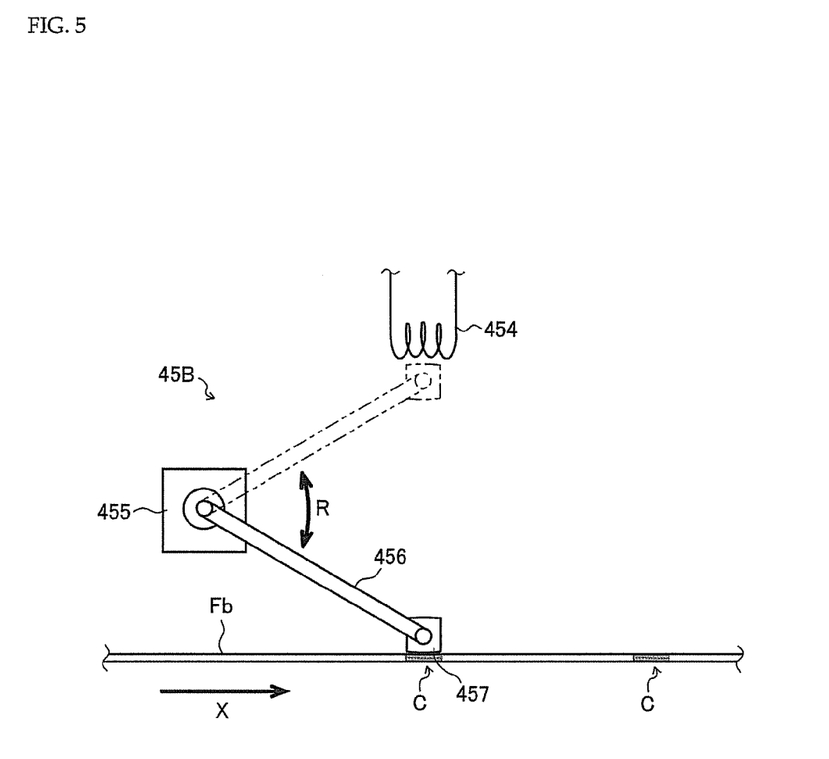
FIG. 5 is a figure illustrating a configuration of a curing device 45B included in the filament winding device 200 according to a second embodiment.

Next, a detailed explanation will be given of a configuration of a curing device 45B.

FIG. 5 illustrates the configuration of the curing device 45B included in the FW device 200 which is a second embodiment. An arrow X in the drawing indicates the feeding direction of the fiber bundle Fb. An arrow R in the drawing indicates the oscillating direction of an arm 456 which constitutes the curing device 45B.

The curing device 45B cures or semi-cures the resin impregnated into the fiber bundle Fb by applying heat to the fiber bundle Fb. The curing device 45B mainly includes a heater 454, a driving part 455, the arm 456, and an iron part 457.

The heater 454 is a coil made of heating wire (such as a kanthal wire or a Nichrome wire) which is formed into a spiral shape, whereby the heater 454 generates heat when a current flows therein. In the present embodiment, the heater 454 is attached to be opposed to the fiber bundle Fb. The heater 454 is configured such that, upon the fiber bundle Fb is fed to the helical winding device 20, the heater 454 continues heating. Since the heater 454 of the present embodiment applies heat to the fiber bundle Fb through the iron part 457, sufficiently large calorific value is secured.

The driving part 455 is configured mainly of an electric motor, whereby the driving part 455 is driven by receiving the supply of electricity. In the present embodiment, the driving part 455 is attached between the fiber bundle Fb and the heater 454. The driving part 455 is configured such that the arm 456 continuously oscillates upon the fiber bundle Fb that is fed to the helical winding device 20. Although a stepping motor is used as an electric motor in the driving part 455 of the present embodiment, the type of the motor is not limited to this. For example, a servo motor or the like may be used alternatively.

The arm 456 is a structure having an approximately square column shape, and is oscillated by the driving part 455. In the present embodiment, one side end portion of the arm 456 is attached to a driving shaft of the driving part 455. The iron part 457 is attached to the other side end portion of the arm 456. Although the arm 456 of the present embodiment is oscillated centered around the driving shaft of the driving part 455, the arm may be alternatively configured such that the arm is oscillated through gears or link mechanism.

The iron part 457 is a metal plate formed into a substantially rectangular shape, and the iron part 457 stores heat while approaching the heater 454. The iron part 457 applies heat to the fiber bundle Fb by contacting the fiber bundle Fb. In the present embodiment, the iron part 457 is attached to the end portion of the arm 456. Accordingly, the iron part 457 integrally oscillates with the arm 456. In the present embodiment, one iron part 457 is attached to the end portion of the arm 456. However, the number of the iron part 457 is not limited to this.

Figure 6:
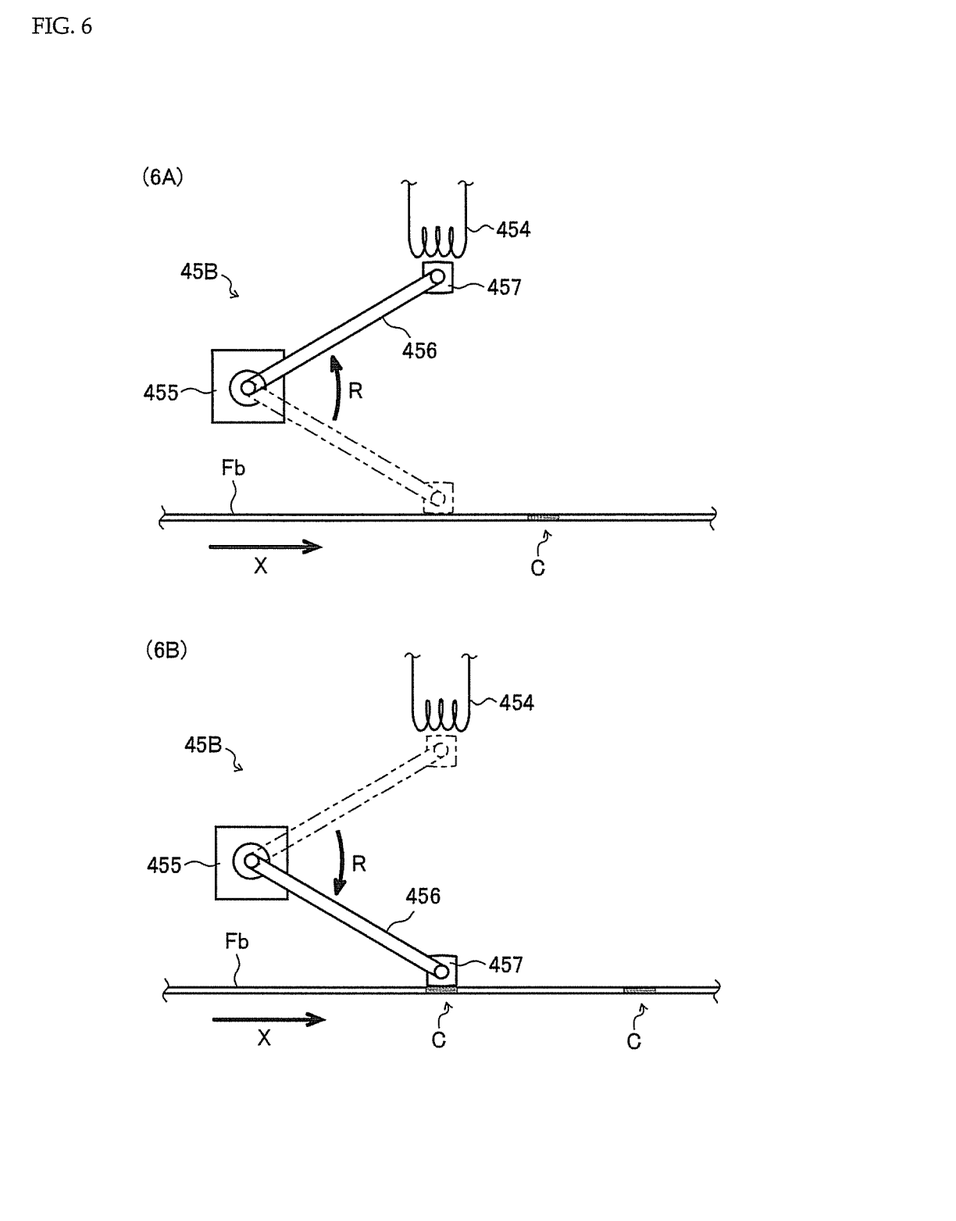
FIG. 6 is a figure illustrating an operation mode of the curing device 45B.

Hereinafter, an explanation will be given of an operation mode of the curing device 45B.

FIG. 6 illustrates the operation mode of the curing device 45B. Arrows X in the drawing indicate the feeding directions of the fiber bundles Fb. Arrows R in the drawing indicate the oscillating directions of the arm 456 which constitutes the curing device 45B.

First of all, the iron part 457 integrally oscillates with the arm 456 to a direction separating from the fiber bundle Fb, whereby the iron part 457 approaches the heater 454 (see FIG. 6A). By approaching the heater 454, the iron part 457 is heated, and the heat applied from the heater 454 is stored.

Next, the iron part 457 integrally oscillates with the arm 456 to a direction approaching the fiber bundle Fb, whereby the iron part 457 comes into contact with the fiber bundle Pb (see FIG. 6B). By coming into contact with the fiber bundle Fb, the iron part 457 releases the stored heat. That is to say, by coming into contact with the fiber bundle Fb, the iron part 457 applies heat to the fiber bundle Fb.

Because of this configuration, the curing device 45B cures or semi-cures some of the resin impregnated into the fiber bundle Fb, when the fiber bundle Fb is partway through being guided into the liner 1.

Even when using the curing device 45B, the same effects as those of curing device 45A can be achieved. That is to say, according to the FW device 200 of the present embodiment, even if some of the fibers F comprising the fiber bundle Fb are cut, the cut fibers F would not be tangled in a guide or the like. The cut fibers F can be held by the cured or semi-cured part C of the resin while maintaining flexibility of the fiber bundle Fb. Furthermore, since the rigidity of the fiber bundle Fb against a twisting direction becomes high, twist of the fiber bundle Pb can be suppressed. Since the rigidity of the fiber bundle Fb against a width direction becomes high, the fiber bundle Pb can be transferred in a condition such that the width dimension of the fiber bundle Fb is maintained.

The present curing device 45B is characterized in that the iron part 457 is integrally rotated with the arm 456 in a state where the iron part 457 is attached to the aim 456. Accordingly, in spite of simple structure, some of the resin impregnated into the fiber bundle Fb can be cured or semi-cured continuously.

With respect to the above-described FW device 200, one curing device 45B is provided for one fiber bundle Fb. However, alternatively, a plurality of curing devices 45B may be provided for one fiber bundle Fb. Also, alternatively, the curing devices 45B may be arranged vertically in a manner clamping the fiber bundle Fb.

Furthermore, with respect to the FW device 200, the curing devices 45B are attached to the creel stand 40. However, the attached positions of the curing devices 45B are not limited to this.

The above-described curing devices 45A, 45B may also be attached to the hoop winding device 30.

INDUSTRIAL APPLICABILITY

The present invention can be utilized to a technique of a filament winding device.

DESCRIPTION OF NOTATIONS 100 fiber bundle processing device (filament winding device)
1 liner
10 liner transfer device 20 helical winding device
30 hoop winding device
40 creel stand
45A curing device
451 heater
452 roller
453 iron part
45B curing device
454 heater
455 driving part
456 arm
457 iron part
Fb fiber bundle
F fiber
C cured or semi-cured part

What is claimed is:

1. A fiber bundle processing device that processes a fiber bundle having a heat-curable resin impregnated therein, comprising:
   a curing device capable of applying heat to the fiber bundle;
   wherein the curing device cures or semi-cures some of the resin impregnated into the fiber bundle, when the fiber bundle is partway through being guided into the fiber bundle processing device,
   the curing device comprises:
      a roller that rotates in a state in contact with the fiber bundle;
      and an iron part that comes into contact with the fiber bundle to apply heat; and
   the iron part integrally rotates with the roller in a state where the iron part is attached to the roller.

2. The fiber bundle processing device according to claim 1, wherein the curing device cures or semi-cures the resin impregnated into the fiber bundle at regular intervals along the feeding direction of the fiber bundle.

3. The fiber bundle processing device according to claim 2, wherein the curing device cures or semi-cures the resin impregnated into the fiber bundle perpendicularly relative to the feeding direction of the fiber bundle.

4. A fiber bundle processing device that processes a fiber bundle having a heat-curable resin impregnated therein, comprising:
   a curing device capable of applying heat to the fiber bundle;
   wherein the curing device cures or semi-cures some of the resin impregnated into the fiber bundle, when the fiber bundle is partway through being guided into the fiber bundle processing device,
   the curing device comprises:
      an arm that oscillates along an approaching/separating direction to/from the fiber bundle; and
      an iron part that comes into contact with the fiber bundle to apply heat; and
   the iron part integrally oscillates with the arm in a state where the iron part is attached to the arm.

5. The fiber bundle processing device according to claim 4, wherein the curing device cures or semi-cures the resin impregnated into the fiber bundle at regular intervals along the a feeding direction of the fiber bundle.

6. The fiber bundle processing device according to claim 5, wherein the curing device cures or semi-cures the resin impregnated into the fiber bundle perpendicularly relative to the feeding direction of the fiber bundle.

* * * * *